March 6, 1934.   H. H. SMELTZ ET AL   1,949,585
AUTOMATIC ALIGNING ATTACHMENT FOR STEERING GEARS
Filed April 28, 1933
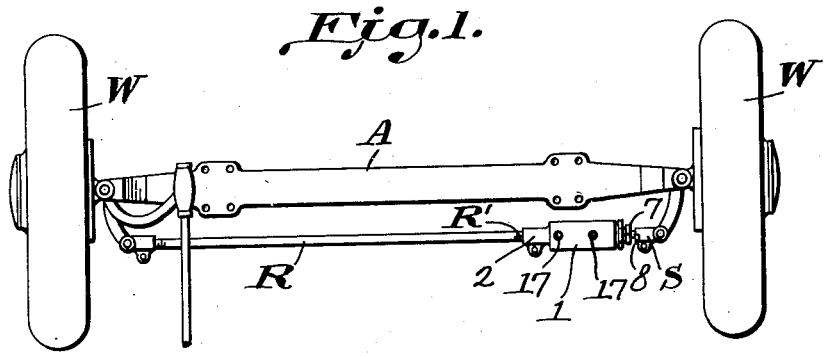
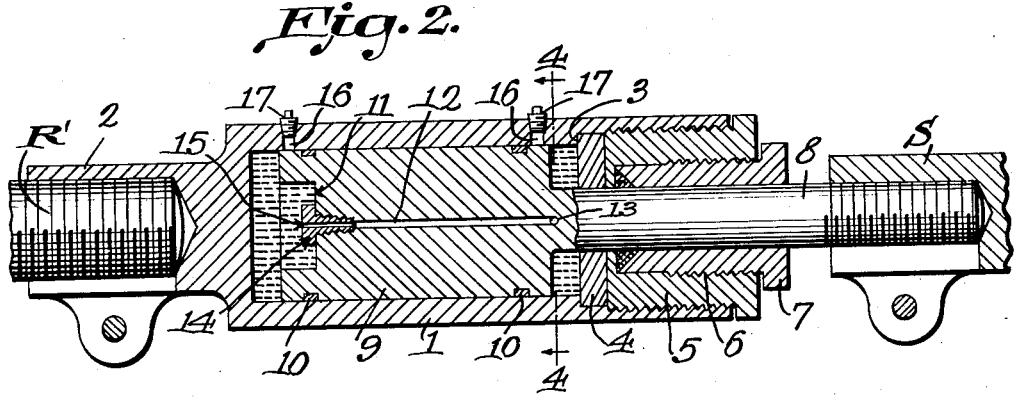
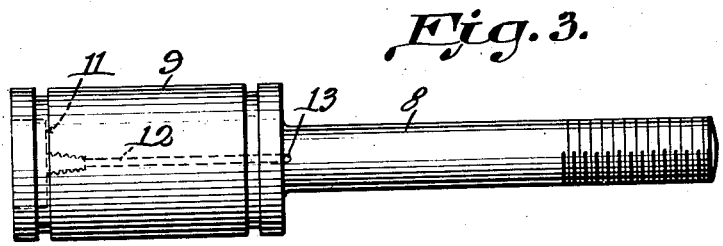
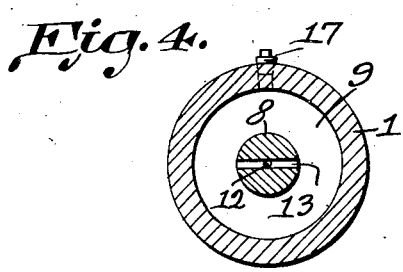
H. H. Smeltz
C. R. Zurn   Inventors Patented Mar. 6, 1934

1,949,585

UNITED STATES PATENT OFFICE 1,949,585

AUTOMATIC ALIGNING ATTACHMENT FOR STEERING GEARS

Harry H. Smeltz and Clarence R. Zurn, Erie, Pa.

Application April 28, 1933, Serial No. 668,445

1 Claim. (Cl. 280—95)

This invention relates to an aligning attachment for use in connection with the steering gear of a motor vehicle.

It is not unusual for the front wheels of a motor vehicle to develop a defect which will cause them to wobble or "shimmy" while the vehicle is traveling. This undesirable action is objectionable not only because of the vibration produced but also because of the excessive wear upon the tires and other parts which results therefrom. Various attempts have been made to counteract this undesirable motion with unsatisfactory results.

It is an object of the present invention to place in the tie rod of the steering mechanism a hydraulic check which will allow limited relative wobble motions of the front wheels when produced abruptly and in rapid succession, as when the wheels are rotating, the said attachment, however, serving as an efficient connection to insure correct simultaneous movement of the wheels during the steering operation.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing:

Figure 1 is a plan view of the front wheels and axle of a vehicle and a portion of the steering gear, the device constituting the present invention being shown connected to the tie rod.

Figure 2 is an enlarged horizontal section through the device.

Figure 3 is an elevation of the piston.

Figure 4 is a section on line 4—4, Figure 2.

Referring to the figures by characters of reference A designates a front axle provided with wheels W and the usual tie rod R adapted to be actuated by the steering wheel for the purpose of turning the wheels W.

The present invention includes a cylinder 1 having a bored extension 2 interiorly screw threaded to receive the threaded end R' of the tie rod R.

The other end of the cylinder is counter-bored to provide a seat 3 against which is fitted a removable head 4 which is clamped against its seat by a screw head 5 formed with a bore 6. A nut 7, forming part of a packing gland is engaged within the head 5 and provides a bearing for the stem 8 of an elongated piston 9. The outer end of stem 8 is adapted to be secured in a coupling sleeve S such as commonly provided for one end of the tie rod.

The piston 9 is provided with soft metal rings 10 whereby a smooth working fit is produced between the piston and its cylinder. A recess 11 is formed in one end of the piston and has a passage 12 extending therefrom axially of the piston, this passage opening radially through the stem 8 and close to the piston as shown at 13. That end of the passage opening into recess 11 is restricted by a screw plug 14 having a minute opening through it as shown at 15.

Filling openings 16 are formed in the cylinder near its ends and these are adapted to be closed by means of screw plugs 17 after the spaces between the piston and the end of the cylinder have been filled with a suitable fluid.

When the wheels W are properly aligned the piston 9 will be spaced from both heads of the cylinder. The tendency of the wheels is to follow a straight path but if the axes of rotation are not properly aligned the wheels will of course wobble, under ordinary conditions. Where an attachment such as herein described is used the abrupt side motion of one wheel relative to the other will result in the shifting of the piston 9 toward one end of the cylinder and the displacement through opening 15 and passage 12 of a portion of the liquid in the path thereof. This movement and displacement is caused by the effort of the wheel to maintain its straight ahead course. The effort of the other wheel to maintain a straight ahead course will also produce slight relative movement of the piston and cylinder. Thus the wheels will automatically adjust themselves to compensate for the wobbling motion which would otherwise occur.

When the steering gear is brought into action the motion transmitted to the wheels is gradual and will not result in relative movement of the cylinder and piston. Consequently there will be no displacement of liquid and the wheels will be maintained in their proper relative positions under normal conditions. However, if the wheels are out of alignment and wobble during their rotation this undesirable motion will be compensated for during the steering operation in the same way as where the machine is moving straight ahead.

What is claimed is:

The combination with a pair of vehicle wheels having steering knuckles and mounted to maintain automatically a normal, straight-ahead course, of a steering connection between the wheels, and hydraulic means for permitting momentary swinging of the wheels out of alignment and for restoring the wheels to correct alignment, said means including a cylinder joined to and adapted to be reciprocated by the knuckle of one wheel, a piston in the cylinder connected to and adapted to be reciprocated by the knuckle of the other wheel, said piston having a passage therethrough, a removable head seated in one end of the cylinder, adjustable packing means within and engaging the cylinder for holding the head in position, and a fluid completely filling the spaces between the piston and cylinder for instantaneous flow through the passage in either direction under pressures set up by the relative swinging movement of the wheels out of and back into alignment.

HARRY H. SMELTZ.
CLARENCE R. ZURN.